United States Patent [19]

Maeno

[11] Patent Number: 5,138,352
[45] Date of Patent: Aug. 11, 1992

[54] CAMERA

[75] Inventor: Hiroshi Maeno, Tokyo, Japan

[73] Assignee: Canon Kabushiki Kaisha, Tokyo, Japan

[21] Appl. No.: 729,878

[22] Filed: Jul. 11, 1991

Related U.S. Application Data

[63] Continuation of Ser. No. 518,306, May 3, 1990, abandoned, which is a continuation of Ser. No. 287,656, Dec. 21, 1988, abandoned, which is a continuation of Ser. No. 220,948, Jun. 20, 1988, abandoned, which is a continuation of Ser. No. 127,251, Dec. 1, 1987, abandoned.

[30] Foreign Application Priority Data

Dec. 9, 1986 [JP] Japan .................. 61-292990

[51] Int. Cl.⁵ .................................. G03B 1/12
[52] U.S. Cl. .................... 354/173.1; 354/266
[58] Field of Search ............... 354/173.1, 204, 234.1, 354/235.1, 266, 268

[56] References Cited

U.S. PATENT DOCUMENTS

| 3,820,148 | 6/1974 | Osanai | 354/295 |
| 4,294,527 | 10/1981 | Hashimoto et al. | 354/25 |
| 4,380,381 | 4/1983 | Tezuka | 354/173.1 |
| 4,724,450 | 2/1988 | Miyawaki et al. | 354/173.1 |

Primary Examiner—Michael L. Gellner
Attorney, Agent, or Firm—Fitzpatrick, Cella, Harper & Scinto

[57] ABSTRACT

This patent application pertains to a camera provided with a running assembly arranged upon movement from a first position to a second position to make ready for the next exposure. The running apparatus is biased so to be urged toward the second position. The running apparatus may be locked in the first position against its bias force. An electromagnet release mechanism, responsive to actuation of a shutter release, frees the running apparatus from its locked condition by the electromagnetic force from the electromagnet.

3 Claims, 6 Drawing Sheets

CAMERA

This application is a continuation of application Ser. No. 518,306 filed May 31, 1990, which is a continuation of application Ser. No. 287,656 filed Dec. 21, 1988, which is a continuation of Ser. No. 220,948 filed Jun. 20, 1988, which is a continuation of Ser. No. 127,251 filed Dec. 01, 1987, all four applications now abandoned.

BACKGROUND OF THE INVENTION

1. Field of the Invention

This invention relates to a camera of the type in which a lock is provided for assuring that the next shot is removed in response to actuation of a shutter release and, more particularly, to improvements that, even if the lock accidentally releases as the camera slips through the user's hands and is subject to shock when being carried about, the next shot can be taken properly.

2. Description of the Related Art

Generally, cameras have the problem that, for example, when the user drops his camera, it often happens that the latching of the shutter is taken off accidentally opens the shutter despite the fact that no shutter release has been actuated. The conventional mechanism for latching the shutter is provided with a capability of locking the shutter so as not to open accidentally. Because the prior known locking devices are constructed in the form of a mechanical member such as a pawl lever arranged to be taken out of locking engagement manually as when a shutter release is actuated, they are very susceptible to shock or the like.

An attempt has been made to prevent such accidental actuation of the shutter release by increasing the holding force of the latch mechanism in combination with the use of a magnet which is able to generate a sufficient electromagnetic force as to release this latch mechanism. However, this calls for a large increase in the rigidity of the constituent parts and leads to a problem of increasing their size and cost.

SUMMARY OF THE INVENTION

The present invention has been made to eliminate the above-described conventional drawback and to provide a camera which, even when dropped and jarred enables the next cycle of shooting operation to be normally carried out. The camera is provided with running means arranged upon movement from a first position to a second position to make ready for an exposure, bias means for urging the running means toward the second position, locking means for holding the running means in the first position against the force of the bias means, and electromagnetic release means responsive to actuation of a shutter release for generating an electromagnetic force by which the running means is released from the locking connection, wherein the electromagnetic force is not required to be large, while nevertheless permitting assurance of the next shot against the shock to be achieved.

Other objects of the invention will become apparent from the following description of an embodiment thereof.

DETAILED DESCRIPTION OF THE PREFERRED EMBODIMENT

The present invention is next described in connection with an embodiment thereof by reference to the drawings. This embodiment is applied to a full-automatic compact camera which, in addition to AF and AE, has a capability of changing the image magnification. This camera has features that moving of the focusing lens, driving of the shutter and feeding of the film are carried out by only one reversible motor, and that the coordination of the moving mechanism for the focusing lens, the driving mechanism for the shutter, and a mechanism for initiating a camera release is controlled by only one electrically operated magnet device.

Figure 1:
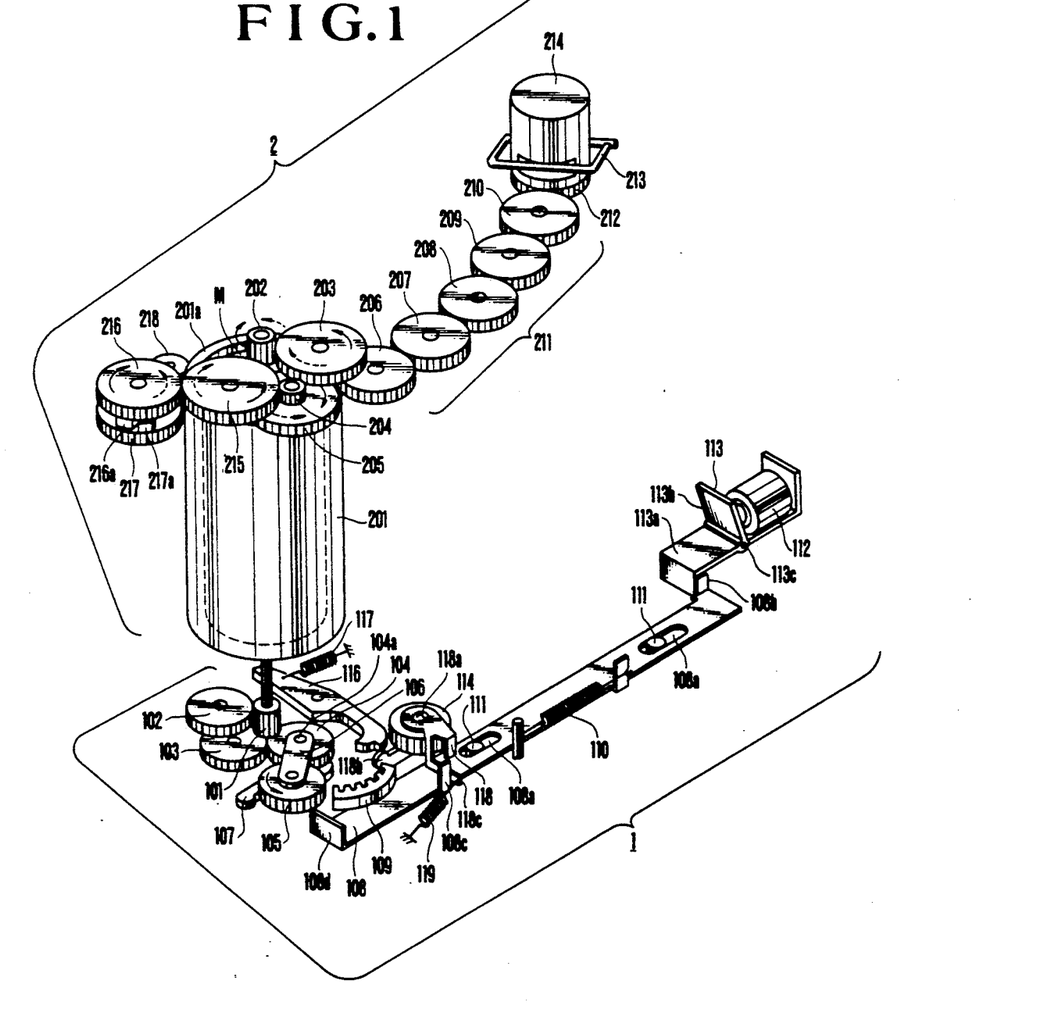
FIG. 1 is a detailed perspective view of an embodiment of a camera with a driving power transmitting mechanism on the front panel of the camera housing and a film transportation mechanism according to the invention.

FIG. 1 is a perspective view generally showing a shutter and lens barrel driving power transmitting mechanism 1 for transmitting the driving power of the reversible motor to the operating mechanisms for the lens barrel and shutter and a film transportation mechanism 2.

In FIG. 1, a spool 201 of known construction which takes up film thereon contains an electric motor M of the reversible type in the interior thereof. A first pinion 202 for supplying the driving power to the film transportation mechanism 2 including the spool 201 is mounted on the top end of the output shaft of the motor M. A first speed reduction gear 203 is in mesh with the pinion 202 and has a small gear (not shown) on the lower surface thereof to rotate in unison. A second speed reduction gear 205 is in mesh with the small gear of the first speed reduction gear 203 and has a second speed reduction pinion 204 on the upper surface thereof to rotate in unison. A rewind mechanism includes a rewinding first gear 206 in mesh with a spool gear 201a unified to the spool 201. Gears 206–210 constitute a gear train 211 for transmitting rotation to a fork gear 212. A fork friction spring 213 is on a fork cover 214. A windup mechanism includes a winding first speed reduction gear 215 in mesh with the second speed reduction pinon 204, a drive clutch gear 216 in mesh with the gear 215, a driven clutch gear 217 arranged upon operative connection to be driven by the gear 216, a spool drive gear 218 in mesh with both gears 217 and 201a. These parts constitute the film transportation mechanism 2.

The drive and driven clutch gears 216 and 217 lying in the middle of the gear train for transmitting rotation of the motor M to the spool 201 have respective drive connection posts 216a and 217a on the confronting surfaces to each other at such locations that after the drive clutch gear 216 has rotated almost one revolution, the driven clutch gear 217 starts to rotate.

The driving power transmission mechanism 1 is supported on the front panel of the camera housing, and, as will be explained below, includes only one planetary gear mechanism and location means for automatically putting a planet gear of that mechanism in a prescribed position. Transmitted to the sun gear 104 is rotation of the motor M from a second pinion 101 on the bottom end of the output thereof through speed reduction gears 102 and 103.

The planetary gear mechanism comprises the sun gear 104, only one planet lever 106 freely mounted around a shaft 104a of the sun gear 104 and turnably connected to the sun gear 104 by a friction spring (not shown), and the only one planet gear 105 rotatably supported on the free end of the planet lever 106 and in mesh with the sun gear 104. Again, the planetary gear mechanism is provided with a planet arm 107 (see FIG. 2) constituting part of the location means for bringing the planet gear 105 to a prescribed position in its orbit. The planet arm 107 supports a shaft of the planet gear 105 and is rotatably mounted on the shaft 104a of the sun gear 104 through a friction spring (not shown). In other words, the sun and planet gears 104 and 105 are sandwiched between the planet lever 106 and planet arm 107. The planet arm 107 is provided with a first engagement portion 107a to act on a primary latch lever 108 to be described later, and second and third engagement portions 107b and 107c to cooperate with a torque arm 116 to be described later. The planet arm 107 constitutes the location means for the planet gear 105 together with a primary latch lever, a torque arm and an electromagnet to be described later.

The primary latch lever 108 is arranged to move approximately in a tangential direction to the orbit of the outer periphery of the planet gear 105. An arcuate internal gear portion 109 of the same radius as that of the orbit of the outer periphery of the planet gear 105 is positioned in fixedly secured relation to a framework (not shown) of the camera. The primary latch lever 108 is a member of a virtual primary latch mechanism formed in the camera of this embodiment. When not shooting, the lever 108 is arrested in a latching position (that is, in order to insure that the next frame of film is protected from accidental exposure) by a lock lever associated with an electromagnet 112 to be described later. When this electromagnet 112 is energized, the primary latch lever 108 is released from the locking connection to move to a position where that planet gear is made possible to engage a common transmission gear of the lens barrel moving mechanism and the shutter drive mechanism.

The primary latch lever 108 is urged by a spring 110 in a direction to enter the above orbit. To allow for movement of the primary latch lever 108 between the above-described two positions, a pair of slots 108a are bored through the wall of the lever 108 in a common longitudinal line. Guide pins 111 (see FIG. 2) extend from the framework of the camera into the respective slots 108a. The tail end of the primary latch lever 108 (in other words, the opposite end to that which has an upward bent portion 108d) is provided with an extension 108b cooperative with a lock lever 113. The lock lever 113 has a first arm 113a arranged to engage the extension 108b and a second arm 113b fixed to a plunger of the electromagnet 112, and is pivotally mounted about a shaft 113c. When the electromagnet 112 is energized, the first arm 113a of the lock lever 113 is turned about the shaft 113c in a clockwise direction to release the extension 108b from the locking connection with the first arm 113a. When de-energized, a spring (not shown) turns the lock lever 113 about the shaft 113c in a counterclockwise direction to arrest the extension 108b as shown in FIG. 1.

The electromagnet 112 is the only electromagnet built in the camera of this embodiment. This electromagnet 112 not only is used as the control means for the lens barrel moving mechanism and shutter drive mechanism, but also serves as primary latch release means for releasing the virtual primary latch mechanism. For these purposes, the electromagnet is energized in response to actuation of a release button on the housing of the camera.

Figure 2:
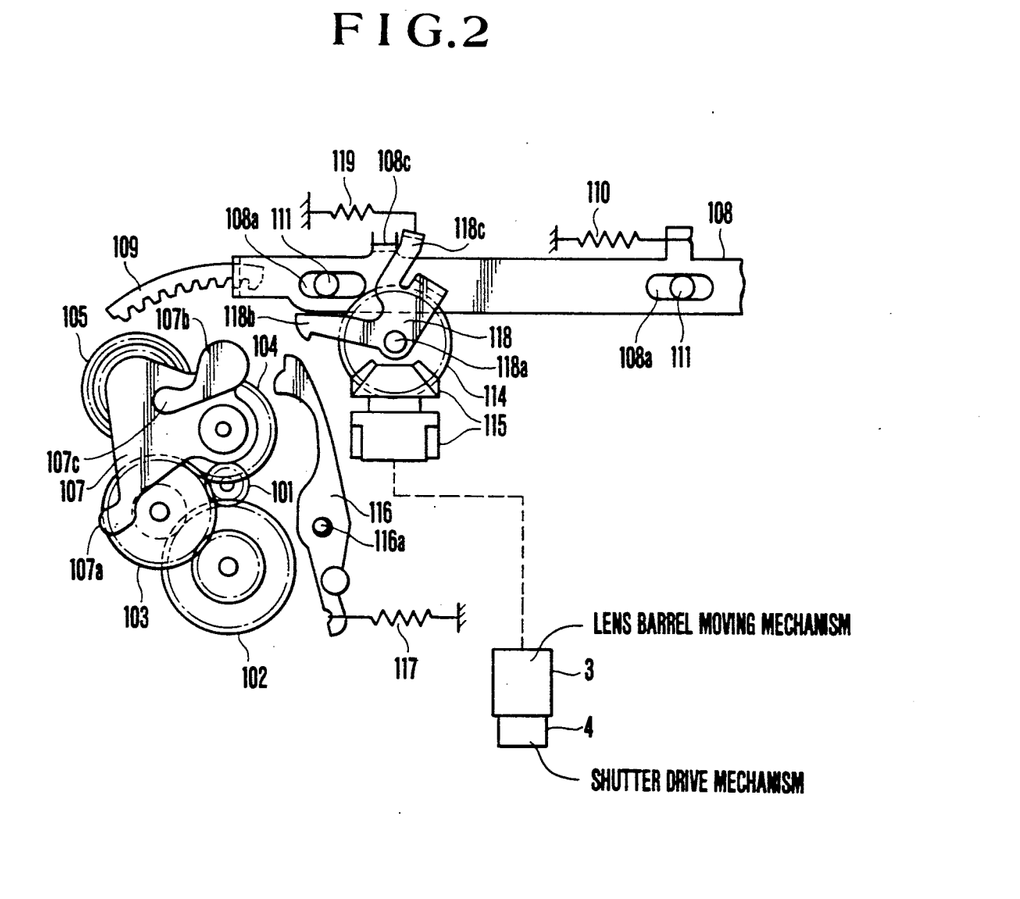
FIG. 2 is a plan view viewed from the bottom of the transmitting mechanism of FIG. 1 in an operative position where the camera is winding up the film and shooting is not in operation.

In FIG. 2, a bevel gear 114 has a spur gear portion engageable with the planet gear 105. This bevel gear 114 is in mesh with a driven gear 115 for transmitting the driving power to a lens barrel moving mechanism 3. A shutter drive mechanism 4 is operatively connected to the lens barrel moving mechanism 3. Hence, when the driving power is transmitted to the bevel gear 114 from the planet gear 105, the driving power from the motor M is supplied to the lens barrel moving mechanism 3 and the shutter drive mechanism 4 through the planetary gear mechanism.

The lens barrel moving mechanism 3 has a screw-threaded shaft rotated directly or indirectly from the driven gear 115. The lens barrel is in meshing engagement with the screw-threaded shaft so that it can axially move on the screw-threaded shaft.

The shutter drive mechanism 4 is supported on the lens barrel. When the lens barrel has reached a predetermined position, the shutter drive mechanism 4 is actuated by a mechanical linking mechanism.

Also, an actuating member whose operation is controlled by the electromagnet 112 is provided in connection with the lens barrel moving mechanism 3 and the shutter drive mechanism 4, so that the lens barrel is stopped and the shutter is opened depending on the energization and de-energization of the electromagnet 112.

It should be noted that the structures of the lens barrel moving and shutter drive mechanisms 3 and 4 are not essential to the invention. So, a more detailed explanation of both mechanisms is omitted.

Also, the film transportation mechanism 2 employed in the camera of this embodiment, though its structure being novel, is not essential to the invention except for the clutch gears 216 and 217. In this written specification, therefore, a more detailed explanation of the film transportation mechanism 2, too, is omitted.

For, as the planet gear 105 orbits to a prescribed position, this position is determined and it is held in this position, a torque arm 116 is provided as one element of the location means and arranged adjacent the planetary gear mechanism to engage with the second and third engagement portions 107b and 107c of the planet arm 107. This torque arm 116 is pivotally supported on a shaft 116a parallel to the shaft 104a of the sun gear 104, and is urged by a spring 117 to turn about the shaft 106a in a counterclockwise direction as viewed in FIG. 2.

Again, positioned adjacent the free end of the torque arm 116 is a hook arm 118 of the bell crank shape pivotally mounted on a parallel shaft 118a to the shaft 116a. Of two fingers of the hook arm 118, the tip of one finger 118b is formed to a pawl for engagement with the free end of the torque arm 116. The other finger 118c is urged by a spring 119 to abut on an extension 108c of the primary latch lever 108. It should be noted that though the shaft 118a of the hook arm 118 is shown in the same position as that of the shaft of the bevel gear 114, these shafts are not necessarily in coincidence with each other.

Next, the operation of the driving power transmitting mechanism 1 of such construction is described along with the operation of the camera of this embodiment by reference to FIGS. 1 to 9.

When the camera of this embodiment is not shooting, the motor M is stopped, and the electromagnet 112 is unenergized, so that, as shown in FIG. 1, the lock lever 113 holds the primary latch lever 108 in the first position where the planet gear 105 is prohibited from going to the bevel gear 114. The relationship of the operative positions the various parts of the driving power transmitting mechanism 1 take at this time is shown in FIG. 2.

As to the film transportation mechanism 2, when not shooting, the drive connection post 216a of the drive clutch gear 216 is in stationary contact on the left hand side of the post 217a of the driven clutch gear 217.

When the user of the camera pushes the release button (not shown) down to a first stroke, the electromagnet 112 is energized to turn the lock lever 113 about the shaft 113c in the clockwise direction as viewed in FIG. 1, thereby the pawl of the arm 113a is disengaged from the extension 108b of the primary latch lever 108. Then, the primary latch lever 108 runs to the left as viewed in FIGS. 1 and 2 under the action of the springs 110 and 119. When the right hand ends of the slots 108a have come on the guide pins 111 (see FIG. 3), the lever 108 stops in the second position. Such running permits the finger 118c of the hook arm 118 to be pulled by the spring 119 to the left. Therefore, the hook arm 118 is caused to turn in the counterclockwise direction as viewed in FIG. 2 until the finger 118b reaches the position of FIG. 3.

Meanwhile, at the same time when the electromagnet 112 is energized, a control circuit (not shown) checks the actual voltage of the battery. And, the completion of the checking operation is followed by automatic measurement of the object brightness and distance by a light meter and a range finder (not shown). Upon presentation of their results on the display of the camera, the release button may be pushed down to a second stroke.

So, when the user of the camera further pushes down the release button, the motor M starts to be energized. The motor M rotates the motor pinion 202 in a direction of solid line arrow in FIG. 1. Therefore, the gears 203, 205, 204 and 215 are rotated in respective directions of the solid line arrow, and the drive clutch gear 216 also is rotated in a direction of the solid line arrow. Since, at this time, the post 216a of the drive clutch gear 216 lies on the left hand side of the post 217a of the driven clutch gear 217, the drive clutch gear 216 starts to rotate, leaving the driven clutch gear 217 behind. Therefore, the driving power is not transmitted to the spool gear 201a for winding up the film until about one revolution of the drive clutch gear 216 is complete.

For this time, because the spool gear 201a lies in its driving power transmission, motion of the motor M is not given to the rewind gear train 211 too. Hence, the fork gear 212 also is not rotated.

Figure 3:
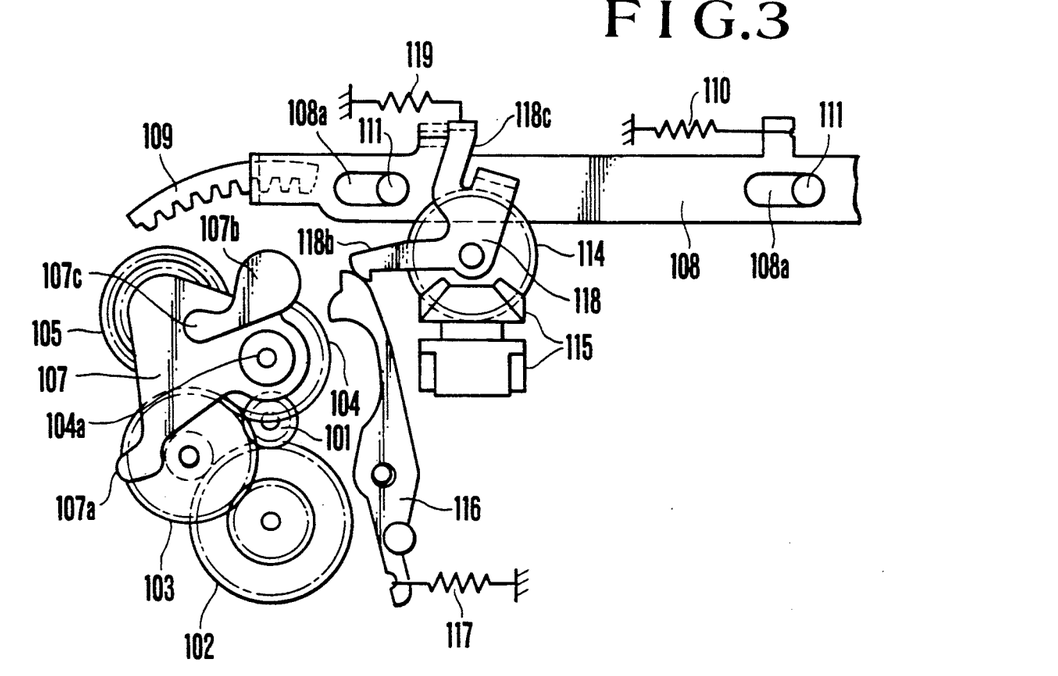
FIG. 3 illustrates a subsequent position to that of FIG. 2 wherein a release button for the mechanisms of FIG. 1 is pushed so that the battery is being checked.

Meanwhile, by the energization of the motor M, the other motor pinion 101 also is rotated in the clockwise direction as viewed in FIG. 1 (counterclockwise in FIGS. 2 and 3). Rotation of the pinion 101 is transmitted through the speed reduction gears 102 and 103 to the sun gear 104 of the planetary gear mechanism. Therefore, the sun gear 104 is rotated in the clockwise direction as viewed in FIG. 3, causing the planet arm 107 to turn about the common shaft 104a of the sun gear 104 in the clockwise direction in FIG. 3. Thus, the planet gear 105 starts to revolve around the sun gear 104 to the clockwise direction.

Figure 4:
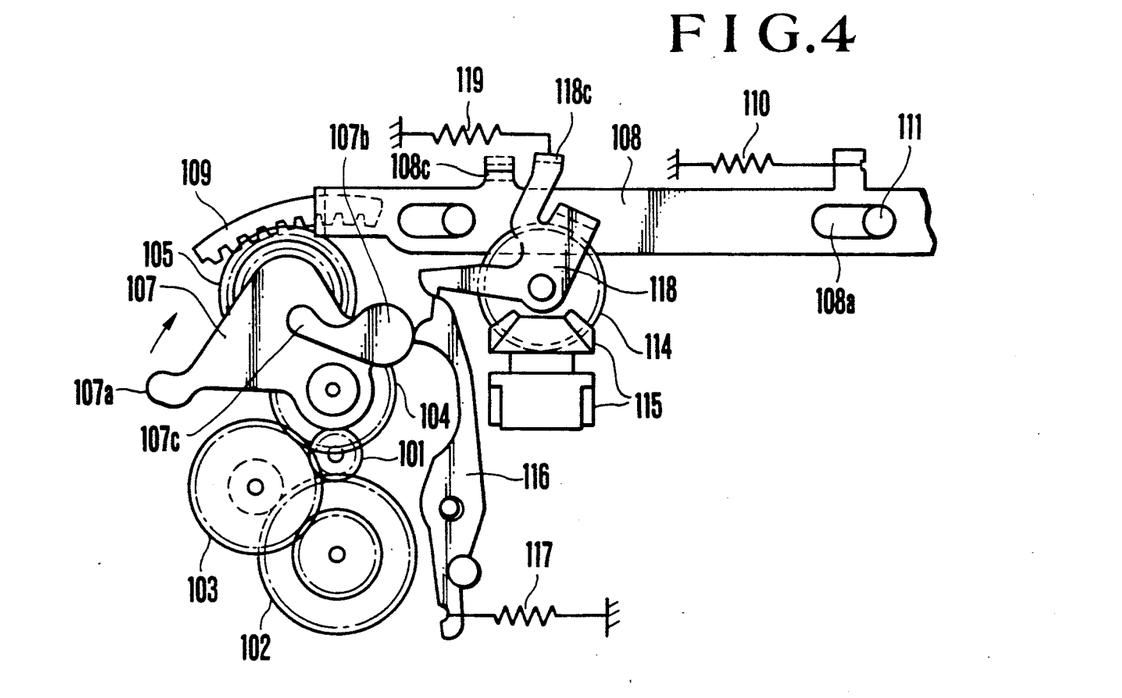
FIG. 4 illustrates a subsequent position to that of FIG. 3 wherein a planet gear of the transmitting mechanism has started to rotate.

Soon after that, the planet gear 105 comes to engage the fragmentary internal gear portion 109. Because the internal gear portion 109 is fixed on the orbit of the planet gear 105, after the planet gear 105 has engaged the internal gear portion 109, the torque transmitted thereto from the sun gear 104 reacts to forcibly rotate it in the counterclockwise direction. Therefore, the planet gear 105 moves along the internal gear portion 109 to the right as shown in FIG. 4.

Along with the planet gear 105, the planet arm 107 also turns about the shaft 104a in the clockwise direction. During this time, the second engagement portion 107b formed on the planet arm 107 makes to contact with the nose of the torque arm 116 and then pushes it to the right past the position of FIG. 4, while overcoming the reaction force of the spring 117, as the planet arm 107 rotates in the clockwise direction.

The reason that the force of revolving the planet arm 107 overcomes the reaction force of the spring 117 in such a manner is that the planet arm 107 is forcibly rotated by the internal gear portion 109.

Figure 5:
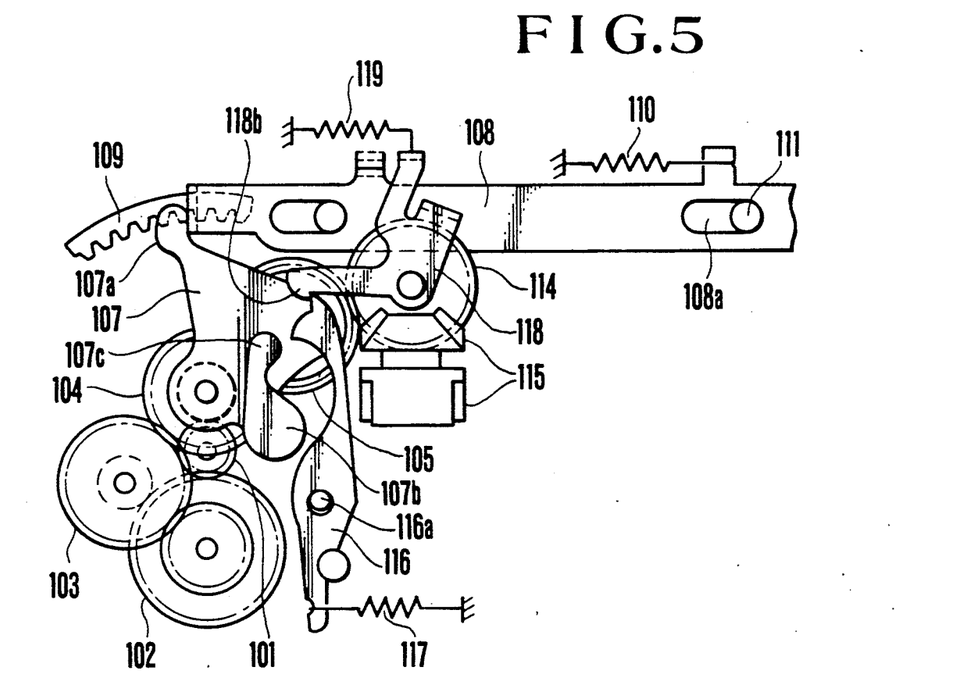
FIG. 5 illustrates a subsequent position to that of FIG. 4 wherein the planet gear has started to engage a focusing mechanism for the photographic lens.
Figure 6:
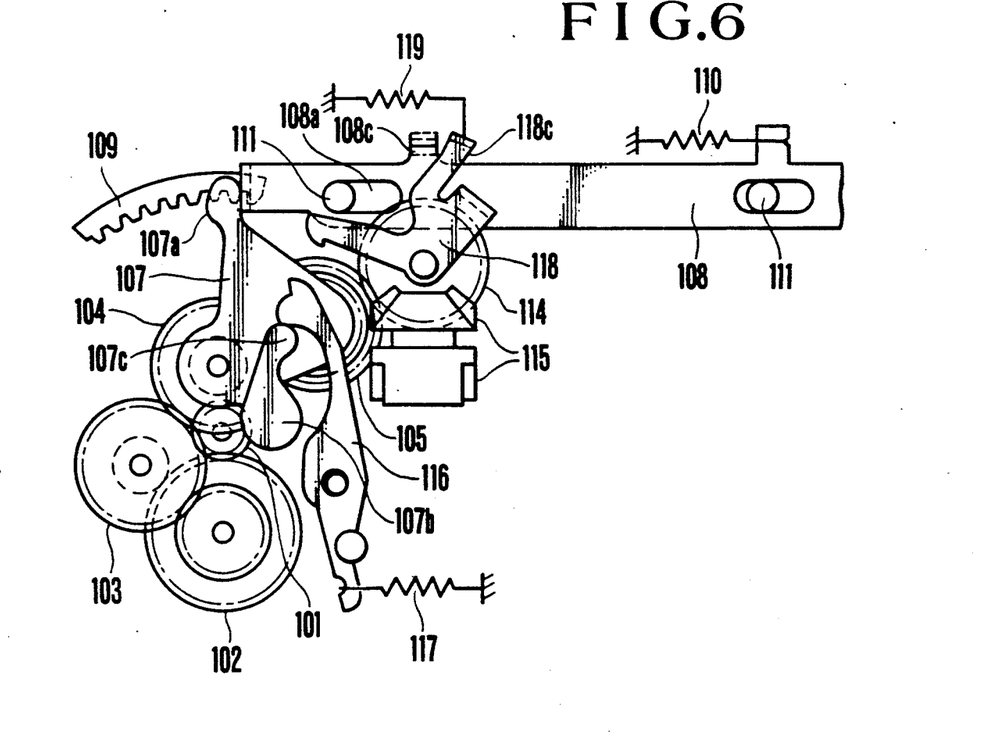
FIG. 6 illustrates a subsequent position to that of FIG. 5 wherein, while the driving connection between the planet gear and the focusing mechanism is maintained, the planet gear is being rotated by a sun gear.

As a result, since the hook arm 118 has already been set in the path of movement of the head of the torque arm 116, the torque arm 116 is arrested by a hook of the finger 118b in the position of FIG. 5. Meanwhile, the planet gear 105 and the planet arm 107 further turn about the shaft 104a in the clockwise direction. Therefore, the second engagement portion 107b of the planet arm 107 also turns about the shaft 104a beyond the nose of the torque arm 116 toward the pivot shaft 116a of the torque arm 116. Then, when the planet gear 105 engages the spur gear portion (ring gear portion) of the bevel gear 114, the first engagement portion 107a of the planet arm 107 abuts on the head of the primary latch lever 108 as shown in FIG. 5. As the sun gear 104 further rotates in the clockwise direction, the planet gear 105 and the planet arm 107 also turn from the position of FIG. 5 further to the right, while pushing the primary latch lever 108 from the position of FIG. 5 to the right. Thereby, the hook arm 118 in engagement with the primary latch lever 108 is turned in the clockwise direction against the force of the spring 119. As a result, the hook arm 118 is disengaged from the torque arm 116. Then, the third engagement portion 107c of the planet arm 107 is arrested by the jaw of the torque arm 116 as shown in FIG. 6. As a result, the planet arm 107 is restrained from backward movement by the torque arm 116 under the action of the spring 117. Thus, the position of the planet arm 107 is determined at the location of FIG. 6. At this time, the primary latch lever 108 is stopped in the over-charged position beyond the pawl of the lock lever 113.

From the time when the planet gear 105 has engaged the bevel gear 114 as shown in FIG. 5 onward, the driving power of the motor M is being transmitted through the planetary gear mechanism to the bevel gear 114 and therefrom further to the lens barrel moving mechanism 3 (FIG. 2), thereby the barrel bearing the photographic lens is axially moved forward. It is to be noted that during this focusing, the direction of rotation of the sun gear 104 is clockwise as viewed in FIG. 6. Therefore, the planet gear 105 rotates counterclockwise, and the bevel gear 114 rotates clockwise as viewed in the same figure.

When the amount of forward movement of the lens barrel has reached a predetermined value, the electromagnet 112 is de-energized by the control circuit (not shown) to permit the lock lever 113 to be turned about the shaft 113c in the counterclockwise direction by the force of the spring (not shown). Thus, the arm 113a of the lock lever 113 enters the path of movement of the extension 108b of the primary latch lever 108, for the locking connection is established as shown in FIG. 1.

After the focusing is completed, the shutter drive mechanism 4 which has moved along with the lens barrel is actuated to make an exposure.

It should be noted the operation up to this stage takes place in the period beginning with the start of rotation of the drive clutch gear 216 from the position of FIG. 1 where its post 216a lies just at the left hand side of the post 217a of the driven clutch gear 217 and terminating at the completion of almost one revolution in the direction of the solid line arrow or until the post 216a arrives just at the right hand side of the post 217a. During this period, therefore, the rotation of the drive clutch gear 216 is never transmitted to the driven clutch gear 217. Hence, the film wind and rewind mechanism is not operated to wind and rewind the film. When the termination of the exposure operation is detected by a switch (not shown) in cooperation with the shutter drive mechanism 4, the above-described control circuit produces an output signal for reversing the rotation of the motor M. As the motor M rotates in the reverse direction to that described above, the motor pinions 202 and 101 rotate in the direction of the dashed line arrow in FIG. 1. As a result, the drive clutch gear 216 of the film windup mechanism also is rotated in the reverse direction of dashed line arrow in FIG. 1. Therefore, the post 216a of the drive clutch gear 216 which the foregoing procedure has put at the right hand side of the post 217a of the driven clutch gear 217 starts to move backward from that position to the direction of the dashed line arrow. Hence, no transmission of the rotation to the driven clutch gear 217 continues until the drive clutch gear 216 rotates almost one revolution in the direction of the dashed line arrow.

Meanwhile, because the motor pinion 101 is rotated in the reverse direction, the sun gear 104 of the planetary gear mechanism is rotated also in the reverse or counterclockwise direction in FIG. 6, and the planet gear 105 in the clockwise direction in the same figure. Therefore, the barrel moving mechanism 3 is driven to move backward through the bevel gear 114 and the driven gear 115. That is, the bevel gear 114 is rotated in the counterclockwise direction, and the driven gear 115 is rotated in the clockwise direction. In this case, the barrel moving mechanism 3, driven gear 115 and bevel gear 114 behave as a load on the planet gear 105. This load works out a torque for rotating the planet gear 105 in the counterclockwise direction. As this torque is applied to the planet gear 105, it is, at the same time, applied through the planet gear 105 as a torque for rotating the planet arm 107 in the counterclockwise direction in FIG. 6 to the planet arm 107. But, so long as the barrel can move, because a larger force than that load acts on the torque arm 116 to hinder the planet arm 107 from counterclockwise rotation, the planet arm 107 stands still in the position of FIG. 6. (That is, the force of the spring 117 urging the torque arm 116 toward the clockwise direction is larger than the magnitude of the load.)

In the driving power transmitting mechanism of this embodiment, in order that the engagement of the planet gear 105 and the bevel gear 114 is not released in such a course of returning the barrel as described above, the third engagement portion 107c of the planet arm 107 engages the torque arm 116 and restrained by the force of the spring 117, so that the planet arm 107 is prevented from turning in the counterclockwise direction by the reaction force from that load. That is, in the driving power transmitting mechanism of this embodiment, design is made in such a way that the force for restraining the planet arm 107 by the spring 117 is larger than the force of turning the planet gear 105 and the planet arm 107 from the position of FIG. 6 to the counterclockwise direction (that is, the reaction force applied from the bevel gear 114 to the planet gear 105).

Therefore, in the driving power transmitting mechanism of this embodiment, even in the course of returning (moving rearward) the barrel, the engagement of the planet gear 105 of the planetary gear mechanism with the load side or bevel gear 114 is maintained effective so that the driving power of the motor M can be transmitted through the planetary gear mechanism to the bevel gear 114.

Figure 7:
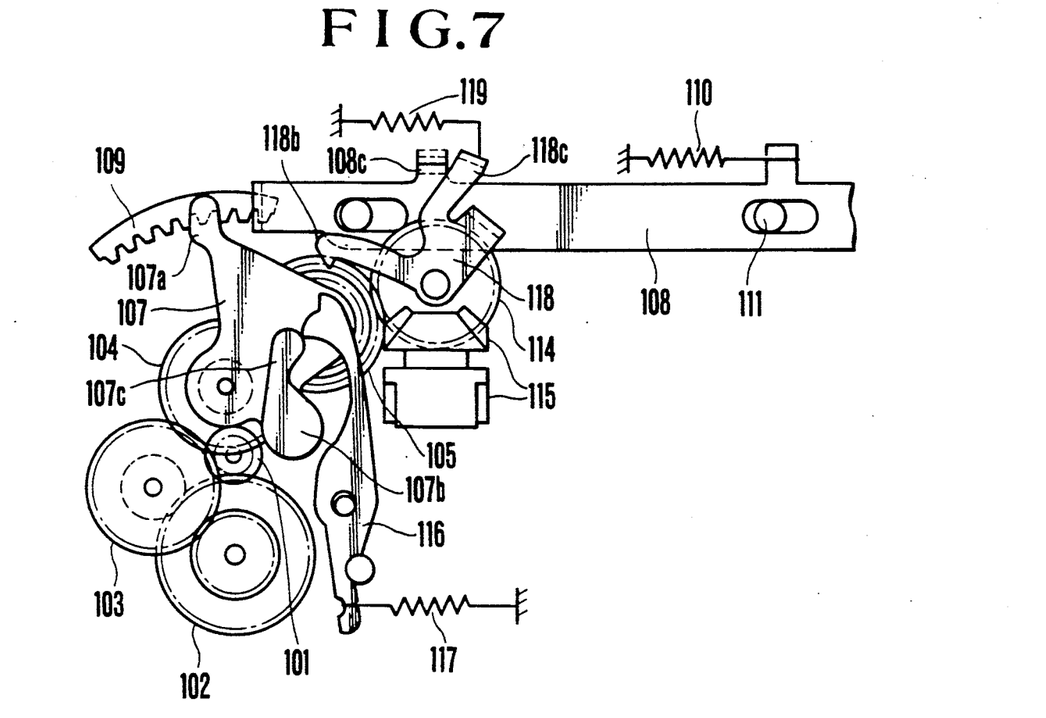
FIG. 7 illustrates a subsequent position to that of FIG. 6 wherein the planet gear is about to be returned to the position of FIG. 2.

As the clockwise rotation of the planet gear 105 goes on under the condition of FIG. 6, when the barrel reaches the initial position, it abuts on a stopper and stops, causing rapid increase of the magnitude of the load including the bevel gear 114. Therefore, the reaction force from the bevel gear 114 of turning the planet gear 105 from the position of FIG. 6 in the counterclockwise direction is also increased rapidly. When the reaction force exceeds the force of the spring 117, the third engagement portion 107c of the planet arm 107 is taken out of engagement with the torque arm 116 and the planet arm 107 starts to rotate from the position of FIG. 6 in the counterclockwise direction. When a position of FIG. 7 is reached, the driving is switched to the sun gear 104. Because the sun gear 104 continues rotating in the counterclockwise direction, the planet arm 107 is further turned in the counterclockwise direction. Also, because the planet gear 105, too, is moved in the counterclockwise direction together with the planet arm 107, the engagement of the planet gear 105 and the bevel gear 114 is cut off, and the primary latch lever 108 which has so far been pushed by the planet arm 107 is locked by the lock lever 113, and left behind in the charge position. Thus, the position shown in FIG. 8 takes place.

Again, because the counterclockwise revolution of the planet gear 105 goes on, it engages the internal gear portion 109 again. Then, while meshing with the teeth of the internal gear portion 109, and rotating on its own axis in the clockwise direction, the planet gear 105 revolves in the counterclockwise direction along the internal gear portion 109, finally reaching the initial position of FIG. 2 together with the planet arm 107.

Figure 8:
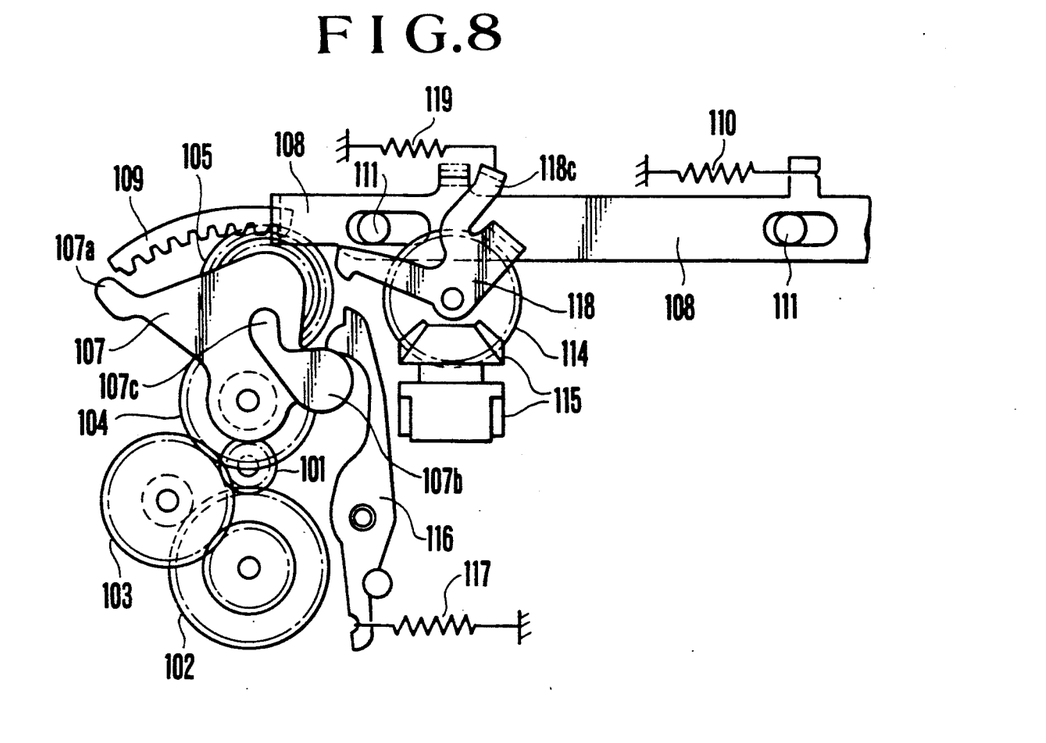
FIG. 8 illustrates a subsequent position to that of FIG. 7 wherein the planet gear is being returned from the position of FIG. 7 to the position of FIG. 2.

It should be noted that in the position of FIG. 8, though the second engagement portion 107b of the planet arm 107 engages the jaw of the torque arm 116, because the radius of curvature of the outer periphery of the second engagement portion 107b is considerably larger than that of the third engagement portion 107c, the pressure under which the torque arm 116 and the second engagement portion 107b make contact with each other is far smaller than that when they are in the position of FIG. 7. Also, because the planet arm 107 is rotated by the enforced torque due to the engagement of the internal gear portion 109 and the planet gear 105, the second engagement portion 107b soon gets out of the engagement with the torque arm 116, returning to the position of FIG. 2.

When the planet arm 107 has returned from the position of FIG. 8 to the position of FIG. 2, the post 216a of the drive clutch gear 216 (FIG. 1) comes from the direction of the dashed line arrow to abut on the left hand side surface of the post 217a of the driven clutch gear 217. From this time onward, the drive and driven clutch gears 216 and 217 in unison rotate in the direction of the dashed line arrow. Therefore, the spool drive gear 218 is rotated, and the spool gear 201a also is rotated. As a result, the spool 201 is rotated. Thus, one cycle of film winding operation is started. It should be noted that the rotation of the motor pinion 202 is transmitted through the spool 201 and the gear train 211 to the fork gear 212, and the fork is rotated. But, for this time, the fork is in the retracted position from the hub of the film cartridge, the whole body of the fork being contained in the fork cover 214. Hence, winding up of the film is possible.

During the winding operation, when the film has been wound up by one frame sensed by a detector (not shown), the control circuit stops the motor M. Thus, the camera is set to ready for the next shot.

It should be noted that during the film winding operation, the sun and planet gears of the planetary gear mechanism are rotating in vain in the position of FIG. 2.

After such a procedure has been repeated a number of times each for one shot, when the film no longer moves between the cartridge and the spool 201 (that is, as that area of the film in the cartridge which was usable for exposure all has been pulled out, when the film is in the so-called "stretched" state), the detector for the amount of fed film no longer produces the output signal. In response to this, the motor M is energized to rotate the motor pinion 202 in the direction of solid line arrow in FIG. 1.

Therefore, the sun gear 104 of the planetary gear mechanism also, similarly to the foregoing, starts to rotate in the clockwise direction in the position of FIG. 2. Thereby, the planet arm 107 is turned from the position of FIG. 2 to the clockwise direction. Hence, the planet gear 105 starts to revolve from the position of FIG. 2 to the clockwise direction. For this time, however, because the electromagnet 112 is not energized to permit the primary latch lever 108 to rest at the rightmost position by the lock lever 113, the hook 118b of the hook arm 118 is held away from the path of movement of the head of the torque arm 116, remaining in the position of FIG. 2.

As the clockwise movement of the planet arm 107 goes on, after the second engagement portion 107b has passed the front of the nose of the torque arm 116, the situation that the torque arm 116 is to be arrested by the hook arm 118 is not encountered. Instead, the torque arm 116 comes out again on the orbit of the planet arm 107 to block rotation of the planet arm 107. As a result, in a position of FIG. 9, the third engagement portion 107c of the planet arm 107 abuts the nose of the torque arm 116, and an equilibrium is established. Hence, the planet gear 105 is not brought into engagement with the bevel gear 114. Thus, the planet gear 105 is allowed to rotate in vain in the position of FIG. 9.

Figure 9:
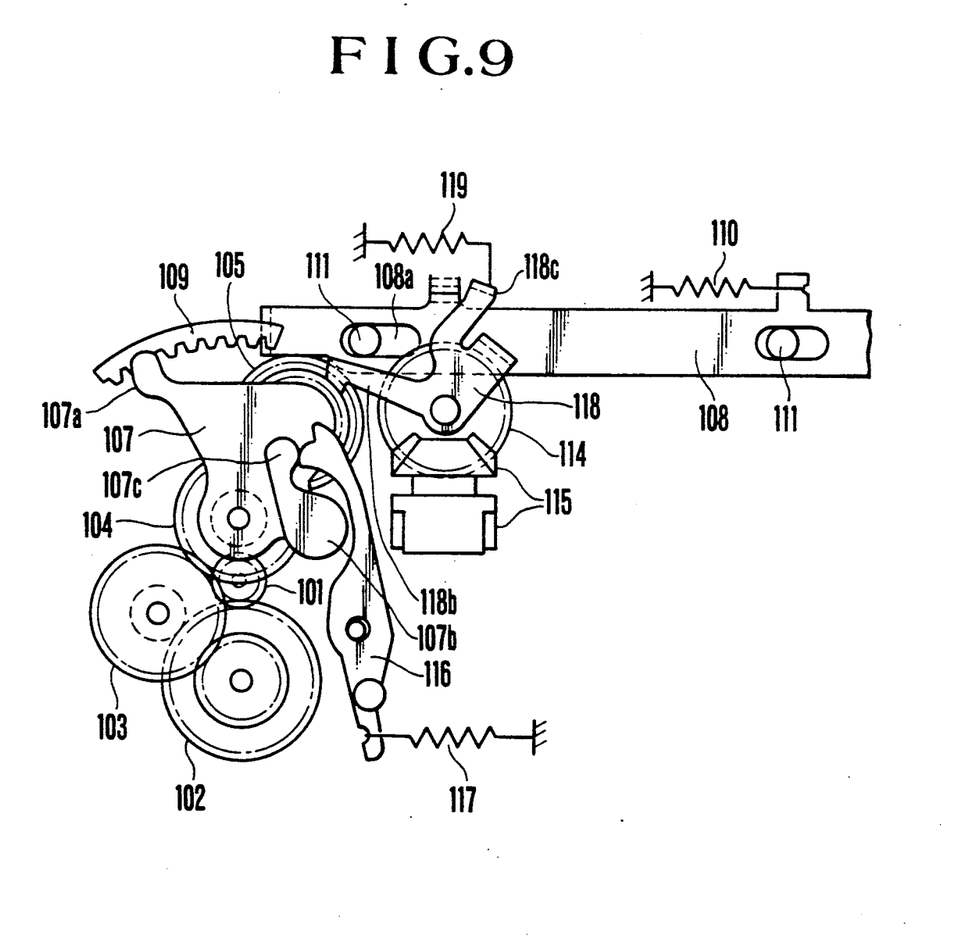
FIG. 9 is a plan view viewed from the bottom of the transmitting mechanism of FIG. 1 in an operative position where the camera is rewinding the film.

Even after the planet gear 105 has been located in the position of FIG. 9, the motor pinion 202 continues rotating in the direction of the solid line arrow (film rewinding direction). Because the drive and driven clutch gears 216 and 217 start to rotate in unison, the spool 201 is rotated through the gear 218 to the rewinding direction. And, because the rotation of the pinion 202 is transmitted through the spool 202 and the gear train 211 also to the fork gear 212. Since, at this time, the fork gear 212 rotates at least several revolutions, the fork in helical gearing relation with the fork gear 212 is caused to extract from the interior of the fork cover 214 to almost all length, while entering the cartridge chamber and engaging the hub of the cartridge. Thus, after the rotation of the motor pinion 202 has been transmitted through the clutch gear set 216, 217 and the spool drive gear 218 to the spool 201, the subsequent rotation of the motor pinion 202 is transmitted through the fork gear 212 to the fork and therefrom further to the supply spool of the cartridge, thereby rewinding of the film is performed.

During the rewinding operation, the above-described detector for the amount of fed film is used for detecting the amount of rewound film. As a result, when the film is all rewound into the cartridge the control circuit certifies such to be the case and reverses the rotation of the motor M in the direction indicated by the dashed line arrow in FIG. 1. Therefore, the sun gear 104 of the planetary gear mechanism starts to rotate in the counterclockwise direction in the position of FIG. 9. Along with this, the planet arm 107 also starts to rotate in the counterclockwise direction. Because there is nothing to hinder motion of the planet arm 107, that arm 107 returns to the position of FIG. 2. The motor M continues rotating for a prescribed time. During this time, the fork is pulled out of the cartridge, and restored in the fork cover 214 by the rotation transmitted from the motor pinion 202 to the fork gear 212 (the rotation of the film winding-up direction). After that, the motor M is stopped. At this time, the post 216a of the drive clutch gear 216 stops just at the abutting position on the left hand side surface of the post 217a of the driven clutch gear 217. Thus, the various portions of the camera have been set in the condition that when the next camera release is actuated, such a procedure as described above can perfectly repeat itself again.

In the camera of the invention, thanks to the use of the shutter and lens barrel driving power transmitting mechanism 1 of the structural feature described above, if the user accidentally drops his camera when not shooting even if the resultant shock has caused disengagement of the lock lever 113 from the primary latch lever 108, and leftward movement of the primary lever 108 from the position of FIG. 1, the motor M, as its energization is not actuated, does not permit start of rotation of the planet gear 105. Hence, there is no possibility of releasing the shutter in response to removal of the locking connection. Thus, the occurrence of such an accident never leads to an unintentional exposure.

As has been described above, according to the present invention, the camera is provided with running means arranged upon movement from a first position to a second position to make ready for the next exposure, bias means for urging the running means toward the second position, lock means for locking the running means in the first position against the force of the bias means, and electromagnet release means responsive to actuation of a shutter release for releasing the running means from the locking connection by electromagnetic force, thereby giving a great advantage that, as the user lets the camera slip, even when so large a shock as to accidentally break the locking connection is given to the camera, it is insured that the next shot can be taken normally, while nevertheless permitting use of an electromagnet of small force in controlling the lock means.

What is claimed is:

1. A camera comprising:
   (A) running means arranged for movement from a first position to a second position;
   (B) bias means for urging said running means toward the second position;
   (C) lock means for locking said running means in the first position against the bias force of said bias means;
   (D) release means for releasing said lock means in response to a shutter release operation;
   (E) a motor which is activated in response to the shutter release operation to provide a driving force; and
   (F) photographing means for performing a photographing operation when said lock means is released by said release means, said running means moves to the second position and said motor is activated.

2. A camera according to claim 1, further comprising means for returning said running means to the first position by the driving force of said motor.

3. A camera according to claim 1, further comprising transfer means for transferring an image recording medium by the driving force of said motor, wherein said running means is held in the first position by said lock means when said transfer means operates.

* * * * *

UNITED STATES PATENT AND TRADEMARK OFFICE
CERTIFICATE OF CORRECTION

PATENT NO. : 5,138,352
DATED : August 11, 1992
INVENTOR(S) : Hiroshi Maeno

It is certified that error appears in the above-identified patent and that said Letters Patent is hereby corrected as shown below:

COLUMN 1

Line 5, "May 31, 1990," should read --May 3, 1990,--.

Line 24, "opens" should read --opening--.

COLUMN 2

Line 8, "mechanisms" should read --mechanism--.

Line 42, "is" should read --are--.

COLUMN 5

Line 4, "shaft 106a" should read --shaft 116a--.

COLUMN 10

Line 21, "spool 202" should read --spool 201--.

Signed and Sealed this

Twelfth Day of October, 1993

Attest:

BRUCE LEHMAN

*Attesting Officer*  *Commissioner of Patents and Trademarks*